(12) United States Patent
Krauss

(10) Patent No.: US 11,161,631 B2
(45) Date of Patent: Nov. 2, 2021

(54) ION PROPELLED VEHICLE

(71) Applicant: Ethan Daniel Krauss, Oberlin, OH (US)

(72) Inventor: Ethan Daniel Krauss, Oberlin, OH (US)

(73) Assignee: Ethan Daniel Krauss, Oberlin, OH (US)

( * ) Notice: Subject to any disclaimer, the term of this patent is extended or adjusted under 35 U.S.C. 154(b) by 174 days.

(21) Appl. No.: 16/180,067

(22) Filed: Nov. 5, 2018

(65) Prior Publication Data

US 2019/0152625 A1    May 23, 2019

Related U.S. Application Data

(63) Continuation-in-part of application No. 14/821,216, filed on Aug. 7, 2015, now Pat. No. 10,119,527.

(60) Provisional application No. 62/034,394, filed on Aug. 7, 2014.

(51) Int. Cl.
   *B64G 1/40*     (2006.01)
   *F03H 1/00*     (2006.01)

(52) U.S. Cl.
   CPC ........... *B64G 1/405* (2013.01); *F03H 1/0037* (2013.01); *F03H 1/0043* (2013.01)

(58) Field of Classification Search
   CPC .... F03H 1/0006; F03H 1/0018; F03H 1/0037; F03H 1/0043; F03H 1/005; F03H 1/0056; F03H 1/0062; F03H 1/0068; F03H 1/0075
   See application file for complete search history.

(56) References Cited

U.S. PATENT DOCUMENTS

| | | | |
|---|---|---|---|
| 2,800,616 A | | 7/1957 | Becker |
| 3,130,945 A | | 4/1964 | De Seversky |
| 3,464,207 A | * | 9/1969 | Okress ............... F03H 1/0087 60/202 |
| 6,145,298 A | | 11/2000 | Burton, Jr. |
| 8,112,982 B2 | | 2/2012 | Metcalfe, III et al. |
| 2003/0227559 A1 | | 12/2003 | Rouvinen et al. |
| 2007/0085486 A1 | | 4/2007 | Okamoto et al. |
| 2009/0044566 A1 | * | 2/2009 | Underdown ....... A44C 15/0015 63/3 |

(Continued)

FOREIGN PATENT DOCUMENTS

| | | |
|---|---|---|
| DE | 3431543 A1 | 2/1985 |
| DE | 4410833 A1 | 10/1995 |
| WO | 02/09259 | 1/2002 |

OTHER PUBLICATIONS

Borg "Blaze Labs EHD Thrusters Research Home of the highest performance EHD thruster cells" (Year: 2004).*

(Continued)

*Primary Examiner* — Gerald L Sung
*Assistant Examiner* — William L Breazeal
(74) *Attorney, Agent, or Firm* — Tarolli, Sundheim, Covell & Tummino LLP

(57) ABSTRACT

An ion powered assembly includes a collector assembly and an emitter assembly, comprising a plurality of conductive emitter wires supported by the emitter wire support structure. A control circuit is operatively connected to at least the emitter and collector assemblies and includes a power supply configured to provide voltage to the emitter and collector assemblies.

20 Claims, 7 Drawing Sheets

(56) References Cited

U.S. PATENT DOCUMENTS

2012/0146555 A1* 6/2012 Ryding .................. H05H 5/04
315/506

OTHER PUBLICATIONS

Lucas "High Voltage Engineering" (Year: 2001).*
Lapointe "Cockcroft Walton Voltage Multiplier" (Year: 2014).*
NASA SpaceFlight.com "Does anyone know what happen to research into Ionocraft or so called Lifters?" 2013.
Clemens "Electro Hydrodynamic EHD Thruster Analysis and Optimization" 2009.
Maxwell Technologies—Products—Ultracapacitors—D Cell Series 2012.
Lucas "High Voltage Engineering" 2001.

* cited by examiner

ION PROPELLED VEHICLE

RELATED APPLICATIONS

This application is a continuation-in-part of U.S. application Ser. No. 14/821,216, filed Aug. 7, 2015 and issued on Nov. 6, 2018 as U.S. Pat. No. 10,119,527, which claims the benefit of U.S. Provisional Application Ser. No. 62/034,394, filed Aug. 7, 2014. Each of these applications hereby incorporated by reference in its entirety for all purposes.

TECHNICAL FIELD

The present invention relates generally to the field of aeronautical devices, and more particularly to an ion propelled vehicle.

BACKGROUND OF THE INVENTION

An ionocraft, or ion-propelled aircraft, is an electrohydrodynamic device that utilizes an electrical phenomenon known as the ion wind effect to produce thrust, without requiring any combustion or moving parts. In its basic form, it simply consists of two parallel conductive electrodes, one in the form of a fine wire or needle point and another which may be formed of either a wire, grid, or streamlined tubes with a smooth round upper surface. When such an arrangement is powered by high voltage in the range of tens of kilovolts, it produces thrust.

Ionocraft provide a number of advantages, including an absence of moving parts, lower friction losses, as compared to a helicopter, due to no spinning blades or gears, and lower production cost due to simpler construction. The craft can avoid many of the speed limiting factors of a helicopter or jet, with the maximum speed is only primarily limited by the power to weight ratio of the power supply input. Compared to a chemical rocket, ion powered flight is far more efficient, has a better delta-v potential and nearly infinite specific impulse, since it can operate as an air breathing device and does not necessarily need to carry any propellant onboard.

SUMMARY OF THE INVENTION

In accordance with an aspect of the present invention, an ion powered assembly is provided. The ion powered assembly includes a collector assembly and an emitter assembly that includes a plurality of conductive emitter wires supported by the emitter wire support structure. Each of the plurality of conductive wires has a diameter of less than five microns. A control circuit is operatively connected to at least the emitter and collector assemblies and includes a power supply configured to provide voltage to the emitter and collector assemblies.

In accordance with another aspect of the present invention, an ion powered assembly includes a collector assembly comprising a plurality of concentric elements. An emitter assembly includes a plurality of conductive emitter wires. The collector assembly and the emitter assembly are configured such that the plurality of concentric elements and the plurality of conductive wires are separated by no less than five and a half inches. A control circuit is operatively connected to at least the emitter and collector assemblies and includes a power supply configured to provide voltage to the emitter and collector assemblies.

In accordance with yet another aspect of the present invention, an ion powered assembly includes a collector assembly and an emitter assembly that includes a plurality of conductive emitter wires each having a diameter of less than five microns. The collector assembly and the emitter assembly are separated by no less than five and a half inches. A control circuit is operatively connected to at least the emitter and collector assemblies and includes a power supply configured to provide voltage to the emitter and collector assemblies.

DETAILED DESCRIPTION

Figure 1:
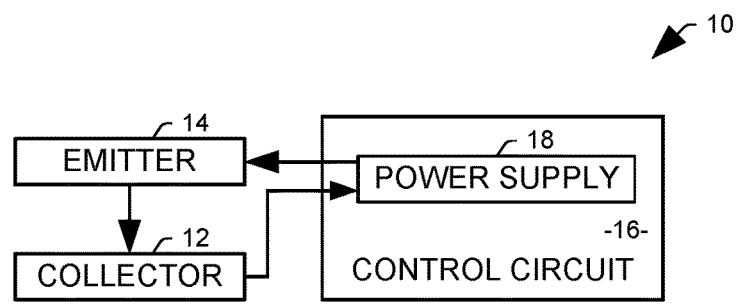
FIG. 1 illustrates an abstract, functional block diagram of a self-contained ion powered aircraft assembly in accordance with an aspect of the present invention.

An ion and/or electron propelled vehicle is presented. Previous efforts in this field have failed to even approach a craft that can lift the complete power source against gravity. In several current implementations, the device entirely self-contained including the power source and is able to lift itself against gravity directly from the ground. It will be appreciated, however, that the systems and methods described herein could be used to provide a thruster for a vehicle, such as an aircraft or a spacecraft, to move the vehicle in directions orthogonal to the pull of earth's gravity, not only vertically, with the onboard power supply. For example, the ion-propulsion could be used to provide additional thrust for a winged craft or to provide horizontal movement for a vehicle held aloft by lighter-than-air gases. While lighter than air ion propelled vehicles have succeeded in the past, they have not used these improvements for propulsion. Also, no heavier than air devices have flown previously using ionic propulsion before the improvements described herein. In one possible implementation, the device could be reconfigured to operate outside of the atmosphere by carrying its own propellant or by releasing very high voltage energetic electrons below the craft. Such a device can accelerate rapidly over long periods of time.

The inventor has made such a craft practical through a series of innovations including the use of ultra thin emitter wires (e.g., less than 5 microns in diameter), minimizing, optimizing, as well as integrating the electronics into an economic single chip design, and or maximizing the power to weight ratio, using an increased distance between the collector and the emitter, selecting optimal shaped collector and emitter assemblies for ideal lift-to-weight ratios, and selecting electrical components for efficiently providing a high voltage differential across the emitter and the collector. For example, the device utilizes a special transformer that, when driven at a higher frequency and in start or quasi start mode, can produce very high voltages for a give turns ratio and size. In several of the implementations, the closest distance between the conductive portion of the collector and conductive emitter wires is from just under six inches to eight inches or more, so long as the resultant load that is reflected to the transformer allows it to remain in a very lightly, almost open, load condition, the special transformer will produce an extra high voltage for its size. In general, the closest distance between the conductive portion of the collector and conductive emitter wires will be no less than five and a half inches.

Direct conversion of electrical energy into kinetic propulsion for the aircraft results in a new qualitative leap in the development of aerospace/aviation since this is now possible. This device has a highly efficient long running low power drive. Significantly higher lift is technically possible and propellant usage can be greatly reduced in the case of the ions, or in theory, that is supported by the inventor's calculations, replaced with electrons partially or completely, at very high voltages.

FIG. 1 illustrates an abstract, functional block diagram of an self contained, ion propelled vehicle assembly 10 in accordance with a primary aspect of the present invention. The phrases "ion propelled" or "ionocraft" are used herein to describe a craft that uses a high-voltage electric field to propel charged particles away from a direction of motion, and it will be appreciated that the phrase is intended to cover both ion-propelled and electron-propelled devices. The ion propelled vehicle assembly 10 includes a collector assembly 12, an emitter assembly 14, and a control circuit 16 operatively connected to at least the emitter assembly and including a power supply 18 configured to provide a high voltage to the collector assembly 12. Accordingly, a strong electric field is produced between the collector 12 and the emitter 14, allowing for the ionization and acceleration of particles within the region between the collector and the emitter.

It will be appreciated that each component of the ion propelled vehicle assembly 10 is configured, including the collector assembly 12, the emitter assembly 14, the control circuit 16, and the power supply 18, in order to efficiently provide thrust with an extremely low-weight system. As a result of the many integrated improvements in ion propulsion, in several implementations, the ion propelled vehicle can provide sufficient thrust to lift each of the collector assembly 12, the emitter assembly 14, the control circuit, and the power supply 18 against gravity, providing ion propelled flight. It will be appreciated that by "lifting against gravity," it is meant that the ion propelled vehicle is capable of rising on its own power from the surface of the Earth with no assistance from lighter than air devices or external power sources.

In one implementation, the collector assembly 12 can include a plurality of concentric elements, with a central support of the device located at a common centroid of the plurality of concentric elements. For example, circular, elliptical, or hexagonal elements can be configured to be concentric and joined by one or more supports. Alternatively, the collector assembly 12 can be configured as an elliptical, circular, or hexagonal spiral assembly with appropriate supports. The collector assembly is generally made from a lightweight material having at least a conductive portion. Example materials that have been used include aluminized polyester film, polypropylene film, and carbon fiber, either with or without a metallic film. If plastic is used, polyimide or another temperature resistant polymer, such as polyester, is preferred as a substrate for space applications. The concentric elements forming the collector are tapered such that a first edge of the collector assembly facing the emitter assembly is wider than a second edge, opposite the first edge, facing away from the emitter assembly.

The emitter assembly 14 can be implemented as a series of thin, conductive wires extended above the conductive elements within the emitter assembly. In one implementation, the emitter assembly 14 and the collector assembly 12 are separated by a plurality of supports holding up an emitter wire support structure that support the conductive emitter wires. In one implementation, the plurality of vertical supports are formed from plastic tubing having a thin wall of around 0.0015" or less. In one example, the emitter wire support structure comprises a rigid outer member, a series of radial threads attacked on at least one end to the rigid outer member, and a plurality of concentric threads supported by the series of radial threads, with the conductive emitter wires being attached along the plurality of concentric threads. In one example, the threads are nylon threads, and the rigid outer member is formed from boron.

In another example, the emitter wire support system includes a plurality of non-conductive mesh screens that each partially enclosing one of the plurality of conductive emitter wires. The mesh screens add support and protection for the wires while permitting air flow to the emitter wires. In still another example, the emitter wire support system includes, for each of the plurality of emitter wires, first and second lengths of non-conductive streamline tubing. A first length of tubing runs parallel to the emitter wire on a first side of the emitter wire and a second length of e tubing runs parallel to the emitter wire on a second side of the emitter wire, with the emitter wire is between the first length of tubing and the second length of tubing. Along with supporting the emitter wire, this arrangement increases airflow to the emitter wire. Another improvement that has been tested to increase lift significantly is to use rigid horizontal emitter wire supports with small plastic standoff nubs that hold the emitter wire away from the horizontal emitter supports this allows airflow to contact all sides of the emitter wire as much as possible. The emitter wires can then also follow curves. This arrangement provides about a 40% improvement in lift.

In one example, the power supply 16 can include any appropriate components for providing a large voltage between the collector assembly 12 and the emitter assembly 14, for example, on the order of thirty thousand volts at low current. In one example, the power supply 16 could be implemented as a series of thin film batteries connected in series to provide the desired voltage. In another example, the power supply 16 includes any number of photovoltaic cells. The power supply 16 can utilize an inverter, such as a modern version of Royer circuit, to feed a specialized transformer with a very high turn ratio, to provide the necessary voltage. In still another implementation, discussed in detail in FIG. 5 below, an inverter, a transformer, and a voltage multiplier are used to provide the desired voltage.

Figure 2:
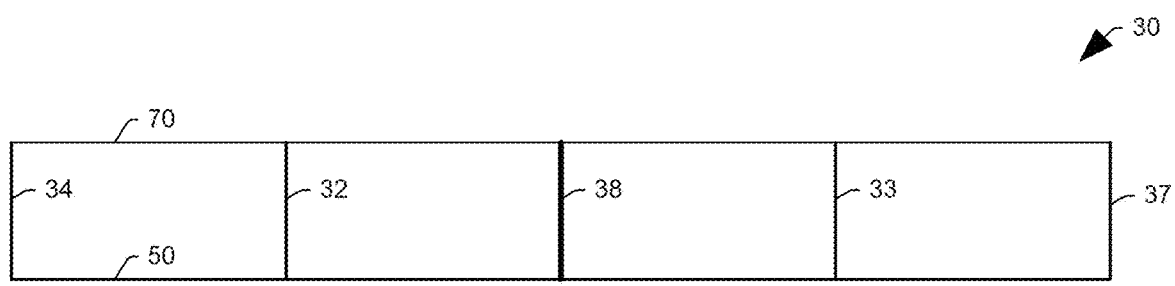
FIG. 2 illustrates an example implementation of an improved ionocraft in accordance with an aspect of the present invention, shown in a side view.
Figure 3:
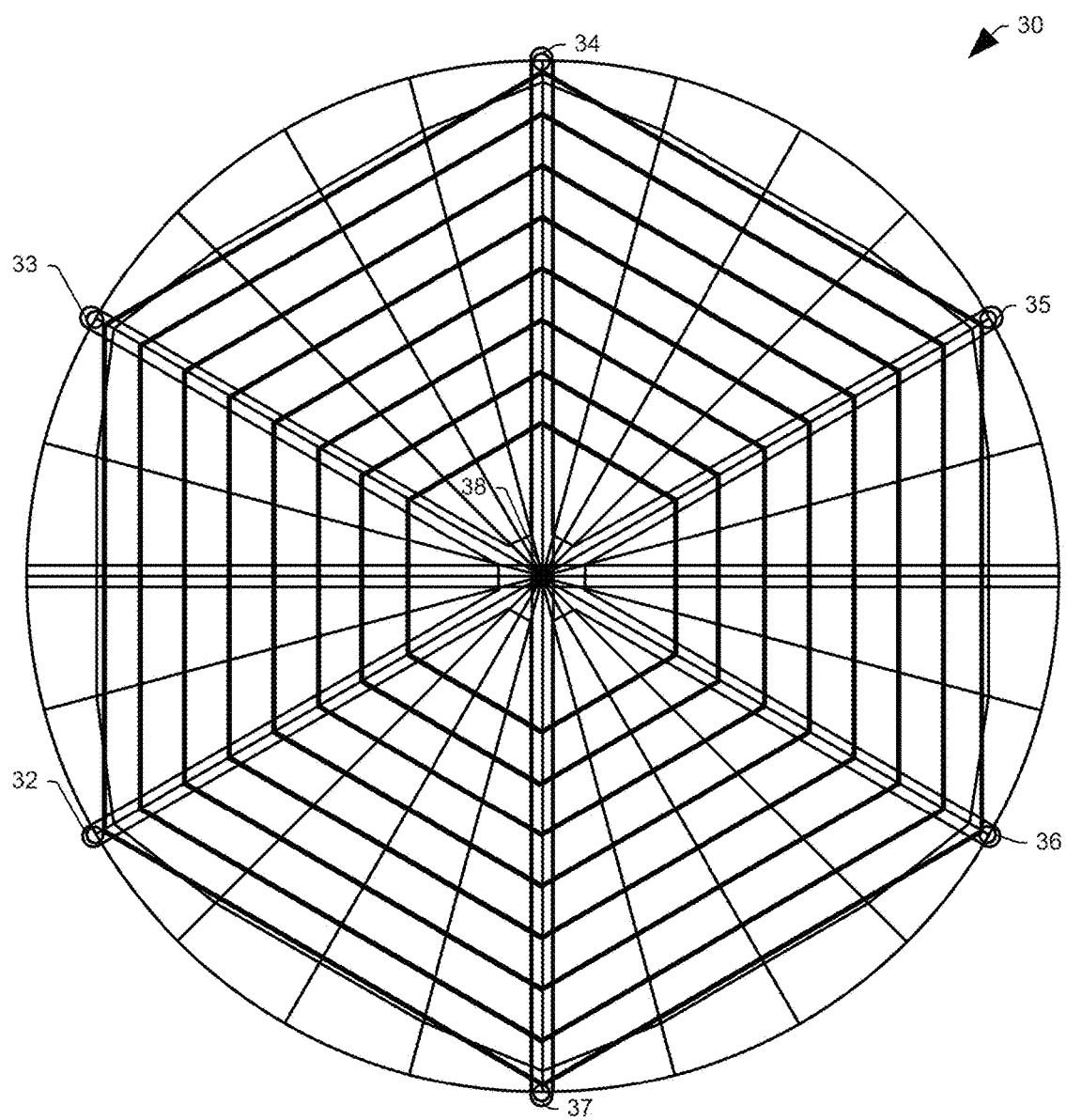
FIG. 3 shows a top view of the device of FIG. 2.

FIG. 2 illustrates an example implementation 30 of an improved ionocraft in accordance with an aspect of the present invention, shown in a side view. FIG. 3 shows a top view of the device 30 of FIG. 2. In the illustrated implementation, the device 30 includes seven support structures 32-38 separating a collector assembly 50 from an emitter assembly 70. The device has a width of about 50.5 inches, and the separation between the collector assembly 50 and the emitter assembly 70 can be just under six and up to eight inches or more, with a difference of between at least twenty five to thirty kilovolts produced between the collector and the emitter. In the illustrated implementation, a set of peripheral supports 32-37 are formed from thin-walled plastic, with a central support 38 formed from either thin-walled plastic or a flexible circuit board. In one implementation, the vertical supports 32-38 can be hollow tubes having walls around one half to three thousands of an inch, that is, 0.5 to three mil or more. A control and power circuit 100 is located in, on, or under the central support 32. A novel voltage multiplier spans most or preferably all of the length of the upright emitter supports.

Figure 4:
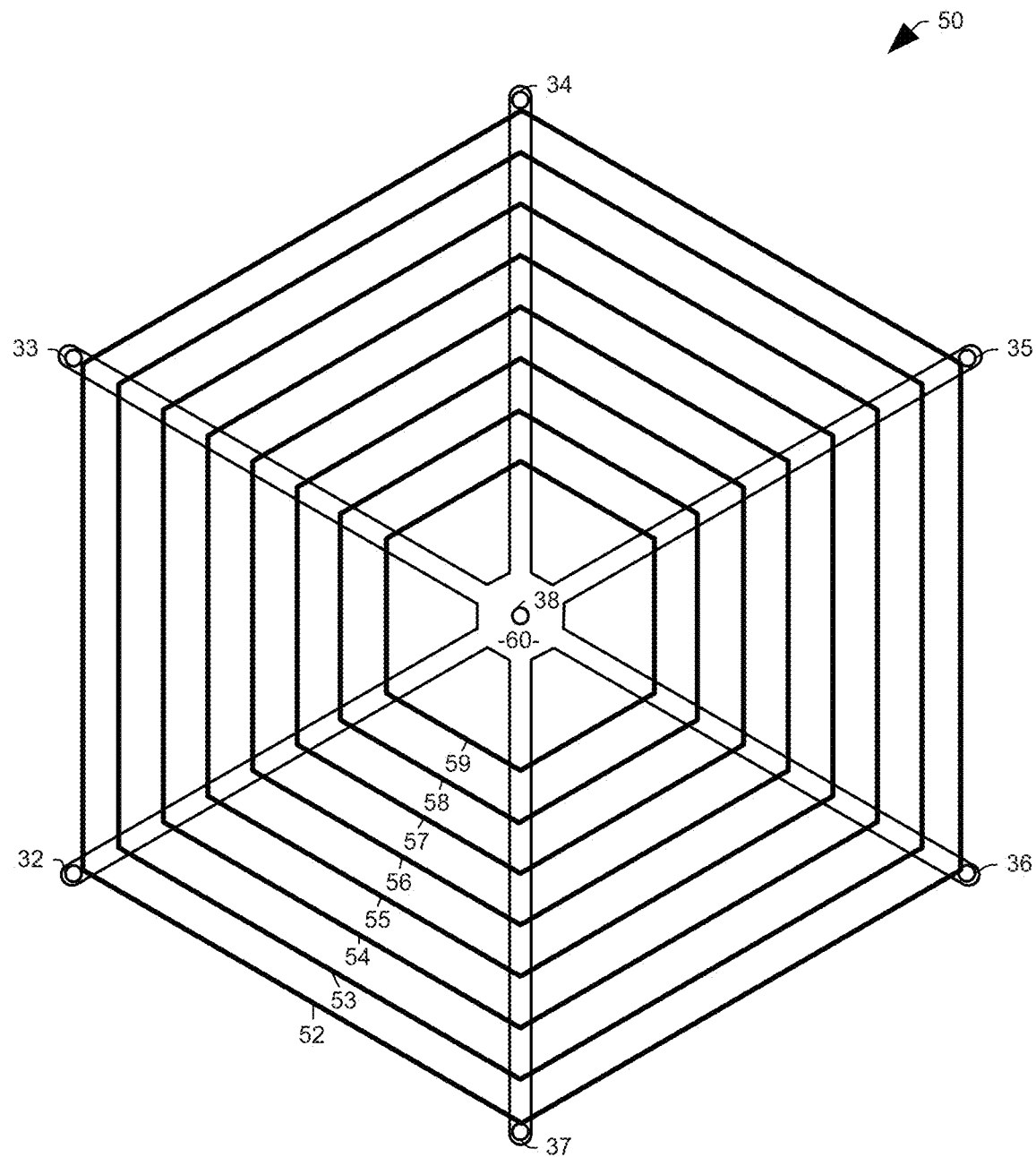
FIG. 4 illustrates a collector assembly for the example implementation of FIGS. 2 and 3.

FIG. 4 illustrates the collector assembly 50 for the example of FIGS. 2 and 3. The collector assembly 50 comprises a series of substantially concentric conductive elements 52-59 supported by a lateral support structure. The inventor has determined that any points on an ionocraft concentrate the electrical energy to the point of producing heat and thereby wastes energy. Accordingly, by spreading the energy out in an even manner lift is produced more efficiently. Further, the device is enhanced by balancing the stress and strain forces on the hyper light materials around a center of gravity in a radial manner Any imbalance of forces or weight of materials may cause the lightweight structure to warp or be relatively less robust. Accordingly, the inventor found that spiral or concentric conductors, having a minimum number of corners, provide a superior collector assembly. Since many jumper wires were needed to distribute the energy in the spiral devices, it has been found that concentric hexagons or circles, provide the same lift but with a better strength to weight ratio than the spiral version.

In the illustrated implementation, the collector assembly 50 includes eight structures 52-59 all sharing a common center collated with the central support 38. In the illustrated implementation, the collector elements 52-59 have cross-sectional shapes in which the edge of each collector element closest to the emitter 70 is wider than the edge farthest from the emitter and rounded, to form a "tear drop" shape, with the rounded edge facing the emitter. In one implementation, the collector can have a thickness of about four mm at its widest point, and height of about nine to twelve mm ideally. In the illustrated implementation, the concentric elements 52-59 are fabricated from carbon fiber, specifically carbon fiber veil, or another non-conductive or semi-conductive substrate and coated with a conductive material. In such an implementation, the substrate can have a thickness less than twenty microns, and in some examples, between three and eight microns.

The choices of materials and operating characteristics are more particular and utilize slightly different lesser known physical principals than are currently popular conceptualizations. These changes result in an orders of magnitude improvement over current state of the art. A non-exhaustive list of improvements over previous device include configuring the system to allow the air to absorb some extra electrons from the emitters, to create negative ions rather than forcing it to create ozone, using a novel, very light, high frequency transformer in strike mode, using a novel voltage multiplier with fully or semi-inline, single row, SMT capacitors, having the voltage multiplier span the distance between the emitter and collector assemblies, using specially shaped, low profile, optimized, teardrop shaped collector rings, using collector material that is as thin as 2to 3 microns for the inner rings and a little thicker for the outer, using custom 8 mil or larger boron filament spokes with lots of non-conductive guy wire filaments that are connected to a central mast to keep the structure rigid with ultra-low weight, special magnetic electrical clamp connections, so as to not damage the thin conductive coating on the collector surfaces, using tungsten emitter wires that are at least an order of magnitude thinner than has been reported in the literature, using concentric rings to get a lot more collector length with less corners, optimized vehicle size, collector length and spacing, and so on. These are some of the steps that result in tremendous improvement over current state of the art. These results have been carefully tested, measured, and demonstrated. Working together these improvements have resulted in many ion propelled aerospace flying vehicles that have been able to lift their power supplies directly off of the ground without any external assistance.

To those skilled in the art and to those who have a good idea of the forces produced and involved, it will be apparent that this is the first such device to fly VTOL with its power supply onboard by a large margin. The closest group to almost push an ion propelled glider horizontally through the air was MIT, though they did not report lift that exceeded drag. It is well known that vertical flight requires significantly more power than in the horizontal.

In different implementation that produces curved ultra-light collector surfaces, ultra-thin-wall, as thin as 5 um or below, polyester shrink tubing can be used to form the collector assembly. The structures can be later aluminized or coated with any conductive material. Even clear tin oxide can be used resulting in a transparent collector surface. The plastic tubing can be heated and formed around a collapsible mandrel, or, a mandrel that may also use air pressure and or Teflon to assist in the release of the collector segments after they are formed. In one example, the wall thickness for the plastic shrink tubing is about three microns but different implementations can vary in thickness depending on the device and the diameter of a given collector ring, this has been tested and shown to form a fairly smooth curved collector with no corners. In one implementation, thin polyester, for example, with a wall thickness of 3 microns, is used for the plastic tubing. It might be assumed that such thin walled materials would be inadequate in terms of rigidity, however, when specific polymers are formed into a tube or streamlined tube structure there is sufficient rigidity to maintain an adequate shape during flight, provided that the collector is supported at sufficient intervals by the boron or other nonconductive or conductive frame.

The concentric elements 52-59 are supported by a base structure 60 comprising six arms extending from a center portion. The central support 38 is connected to the center portion of the base structure 60 and each of the peripheral supports 32-37 are connected at a distal end of one of the arms of the base structure. The base structure 60 can be made from carbon fiber, such as carbon fiber veil, boron, or any other durable, lightweight material. In addition to providing mechanical support to the concentric elements 52-58, the base portion 60 can either be conductive to allow for electrical communication between the control circuit 100 and the concentric elements 52-58, or support appropriate wires or traces to electrically connect the power supply to the concentric elements. In one implementation, the concentric elements 52-59 are connected to the control circuits via respective lead wires. Each lead wire is affixed to one of the at least one concentric elements via a small pair of magnets acting as a clamps, so as to not damage the thin conductive coating, as previously mentioned.

Figure 5:
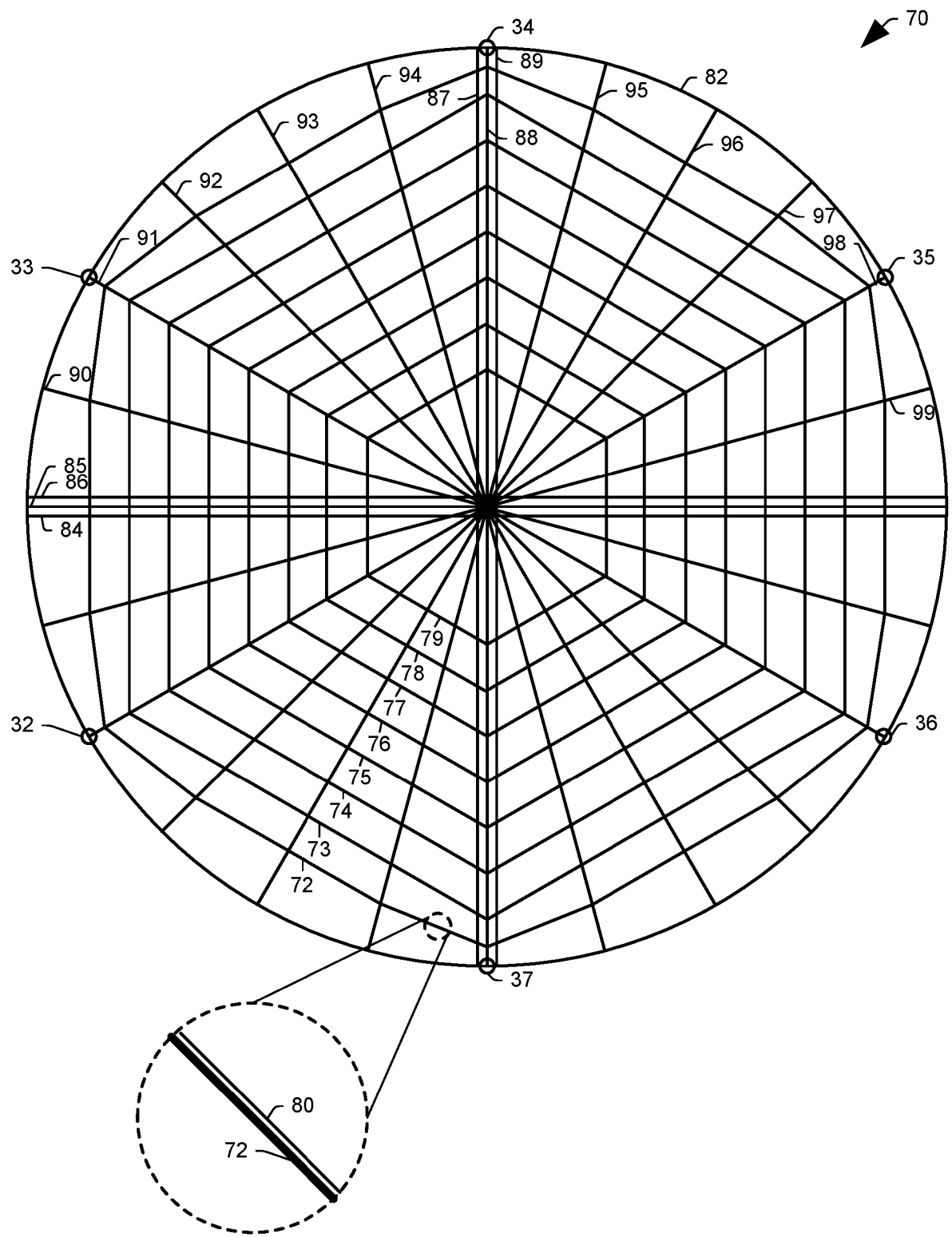
FIG. 5 illustrates an emitter assembly for the example implementation shown in FIGS. 2 and 3.

FIG. 5 illustrates the emitter assembly 70 of the example shown in FIGS. 2 and 3. The emitter assembly 70 can be divided into an emitter wire support structure 72-79 that is spaced from the collector assembly by the plurality of peripheral supports 32-37 and the central support 38, comprising a series of supporting elements each extending within a plane substantially parallel to the collector assembly a plurality of conductive emitter wires supported by the emitter wire support structure. The emitter wire support structure 72-79 can be formed from annealed, pre-shrunk, nylon or other plastic, including Kevlar thread, as well as fishing line, fine polyimide tubing works particularly well. In the illustrated implementation, the emitter wires are joined to the emitter wire support structure 72-79 along their length and are therefore collocated with the emitter wire support structure 72-79 in the illustration of FIG. 5. A portion of a single emitter wire 80 is illustrated with the corresponding portion of its associated emitter wire support structure 72 in an expanded view. The emitter wire support structure 72-79 and the emitter wires are located substantially above corresponding concentric elements 52-58 of the collector. To significantly increase efficiency and lift of the device, the emitter wires are formed from conductive wire that is less than five microns in diameter. In one implementation, wire having a diameter of 2.5 microns is used.

The emitter assembly 70 further comprises a rigid outer member 82, supported by the plurality of peripheral supports 32-37. In the illustrated implementation, the rigid outer member 82 is implemented as a boron loop. A series of radial threads 84-99 are attached on at least one end to the rigid outer member. These threads can be formed from the same material as the emitter wire support structure 72-79. In the illustrated implementation, the radial threads are connected on each end to the rigid outer member, but it will be appreciated that twice as many shorter threads could be employed that connect to the central support 38 at a second end. The series of radial threads 84-99 are, in general, separated from one another by distances of fifteen degrees, but it will be appreciated that two perpendicular sets of triplet threads 84-86 and 87-89 are utilized herein for added support.

In the illustrated implementation, the emitter wire support structure 72-79 is implemented as a plurality of concentric threads supported by the series of radial threads 84-99. To assist in steering of the device, the emitter wires themselves can be implemented in four quadrants, each of which are selectively provided with current from the control circuit 100. Accordingly, the emitter wires may not form an entire concentric shape with its corresponding support structure, 72-79, but are instead broken into four individual paths on each support structure, corresponding to the quadrants of the device. In the illustrated implementation, the individual paths begin and terminate at the sets of triplet threads 84-86 and 87-89, such that these threads effectively define the quadrants.

Figure 6:
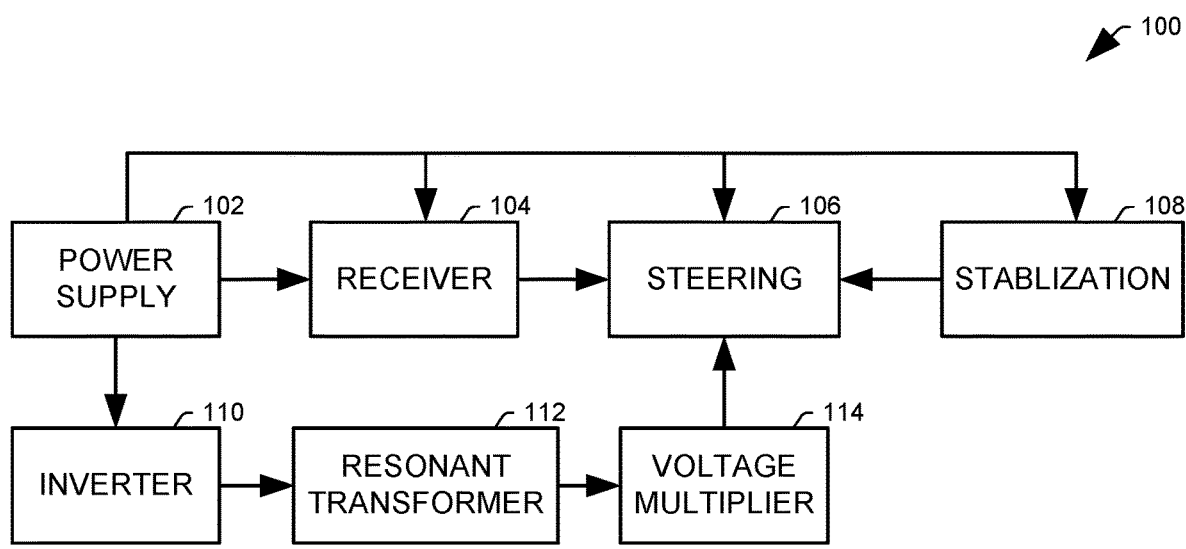
FIG. 6 illustrates a control circuit for the example implementation shown in FIGS. 2 and 3.

FIG. 6 illustrates a control circuit 100 for the example shown in FIGS. 2 and 3. The control circuit 100 includes a power supply 102 that provides power to the various electrical components of the system. In the illustrated implementation, the power supply is implemented as lightweight lithium polymer batteries. Specifically, the illustrated control circuit uses two 20 mAh cells on earlier models to two 110 mAh or more cells on later models, these are high rate lithium polymer batteries but are likely to be superseded by other chemistries in the future. They are charged to roughly 4.17 Volts each, 8.34 volts in series. During operation, they provide a little over seven and a half volts, under load, depending on cell size etc., to about six Volts or less at the end of each flight. Other input voltages can be used, but this was optimum for the particular components.

A receiver 104 receives commands from the user and provides them to a steering component 106. The steering component 106 can include a plurality of variable resistors that are configured to selectively reduce the voltage difference in each of the four quadrants of the device, such that a difference in lift across the device can be created. In one implementation, the variable resistors are mechanical, with a conductive "wiper" moved by mechanical actuators across a series of resistor elements to adjust the resistance associated with each of the four quadrants. A stabilization component 108 can also provide input to the steering component 106. For example, an optical flow sensor or a gyroscope/accelerometer chip can be used to resist unintended motion of the device due to wind or other perturbations.

The battery can also drive an inverter 110 configured to provide an alternating current (AC) signal from a direct current provided by the power supply 102. In one implementation, the inverter 110 is implemented as a modified Royer circuit. In another implementation, a pulse width modulation inverter can be used. The inventor has found that the higher q factor of an oversized inductor can be exploited to improve the Royer inverter, and the illustrated control circuit 110 uses an inductor that is larger than what is normally found in the modern version of the Royer inverter. Specifically, where a Royer inverter is used, the inductor in the inverter 110 is at least half of the size, and can be nearly as large, as a resonant transformer 112 driven by the inverter. That is, a diameter of the inductor 110 may be at least half that of the transformer 112. As with many of these discoveries, this will work best in a particular range. The gain in efficiency and lift more than outweighs the extra weight of the oversized inductor. Using a push pull inverter for the device, such as the pulse width modulation inverter or the Royer circuit doubles the voltage provided for a given size of the driven transformer 112 and increases the efficiency considerably.

Figure 6A:
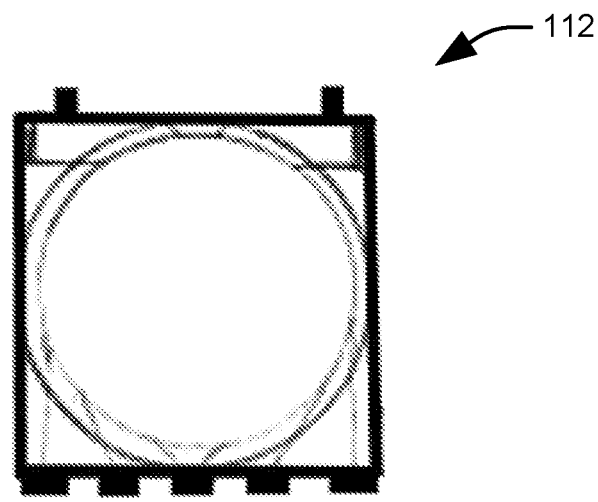
FIG. 6A illustrates a top view of the resonant transformer.
Figure 6B:
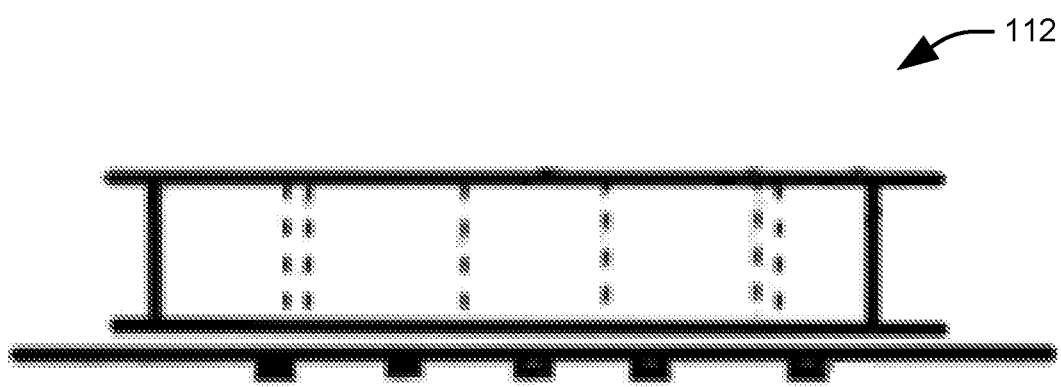
FIG. 6B illustrates a side view of the resonant transformer.

The AC signal from the inverter drives the resonant transformer 112. In the illustrated implementation, a specially insulated and shaped low-profile drum shaped high voltage transformer is used. The secondary is wound on the inside and made of well insulated AWG50 wire. The primary is composed of around 20 turns of silver AWG36Q wire, later models have used thicker primaries. The core is made of relatively high permeability Nickel Zinc due to its low electrical conductivity for micro high voltage applications. In the illustrated implementation, the resonant transformer 112 is a low profile, drum shaped transformer in which a diameter of the transformer is at least two and a half times a maximum thickness of the transformer, and, in some implementations, five or more times the maximum thickness. The device is used in start mode, or strike mode, to produce a continuous three kilovolt output, under light load. FIG. 6A illustrates a top view of the resonant transformer 112. FIG. 6B illustrates a side view of the resonant transformer 112.

The terms "strike mode" or "start mode" are generally used in describing the initial operation of a transformer in a cold cathode fluorescent lamp at an increased voltage on a light load to ignite the lamp. During this time, when the lamp can be modeled as an open circuit, the resonant frequency of the transformer is different from that of the operating mode of the transformer. For most applications, the transformer is not driven continuously in this mode, as it is known to cause damage to the transformer. The specially insulated and shaped transformer 112 described herein allows for the transformer to be operated continuously within strike mode.

Since the transformer is used in this manner, the output current is accordingly reduced to no more than about seven hundred microamps.

The output of the resonant transformer 112 is provided to a voltage multiplier 114. In the illustrated implementation, the voltage multiplier 114 is an elongated half wave Cockroft-Walton type voltage multiplier. The stages are significantly extended, such that the voltage multiplier 114 takes up a substantial portion of the length of the central support 38. In one example, the voltage multiplier 114 spans substantially all of the length of the central support. The voltage multiplier device should increase the voltage over about ten times and reduce the current by more than about ten times. The current output of the voltage multiplier can be around thirty to sixty micro-amps. Past ionic or electrostatic/high voltage flying devices have relied on much higher currents in general. This low amount of current is much safer as well as more efficient. In the illustrated implementation, the resulting output current and voltage is about thirty kilovolts at about forty-seven microamps.

The voltage multiplier embodiment has been improved from the classic Cockroft Walton half wave multiplier design for this application. The classic Cockroft Walton design is a ladder network of diodes and capacitors, with diode paths in the middle of the two rows of capacitors making up the ladder network. In the illustrated implementation, the diode paths are curved, so the diode leads are curved convexly in order to form upward facing humps. The purpose of this in part allows all of the capacitors to be positioned in a straight line or partially so, and at intervals, this results in a longer voltage multiplier that requires less insulation, has less corona losses, and is perfect for positioning between the emitter and collector surfaces of the craft. Another advantage is that the points that would normally be formed where the diodes connect with the capacitor nodes are now directed in the same direction as the electron flow over the wires. This arrangement results in less loss of electrical power without having to add as much insulating material or any large rounded connection points. Further, each given capacitor and diode can be connected by a lead line soldered to a corner of each surface mount component, this allows for the use of less inherently heavy solder.

The negative output of the multiplier then goes to the emitter wire assembly to be distributed to the four steering quadrants dividing the current by four. This reduces the current to 11.75 micro Amps per quadrant. Since this current drains down and spreads out as it makes its way across an emitter assembly, the current is reduced to a lower level. The positive output of the multiplier is provided to the collector assembly 50 to produce the voltage difference. The inventor has determined that lower current and higher voltages produce much more efficient propulsion. The reason for this is that the air between the collector and emitter displays roughly 13 Giga-Ohms or more of resistance at 3 kV and around several hundred Mega-Ohms at about 30 kV minimum. Do to the poor conductivity of the air Joule heating becomes significant when much current is present, it is also important to not create ozone or visible corona since these products are major power losses. It is the inventor's observation that the glowing seen in space-based ion propulsion systems is a power loss in those as well, and becomes a more significant factor a low power levels. The principals discovered in this patent can apply to other types of ion thrusters. This device can accelerate at roughly four orders of magnitude faster than current space-based ion propelled vehicles.

Since there are $6.241 \times 10^{12}$ electrons per micro-amp, there is about $7.3 \times 10^{13}$ electrons available per quadrant that could potentially be absorbed by O2 molecules in the ambient and flowing air near the emitter assembly in each quadrant. Since the emitter wires on just one quarter of the craft are exposed to around 1 Mole per second of O2 and there are $6.022 \times 10^{23}$ particles per mole that implies that something like $6.022 \times 10^{23}$ O2 molecules are available per second to absorb the $7.3 \times 10^{13}$ electrons per second. Since the spaces between the O2 molecules are many times the diameter of the molecules themselves, and the molecules are moving around rather fast, this influences the electron absorption/electron affinity of the O2. In general, only a small percentage of the oxygen is ionized by the low current electrical discharge of the emitter, a sufficient amount to create a gentle quiet breeze. Colder and or denser air will absorb more electrons.

Figure 7:
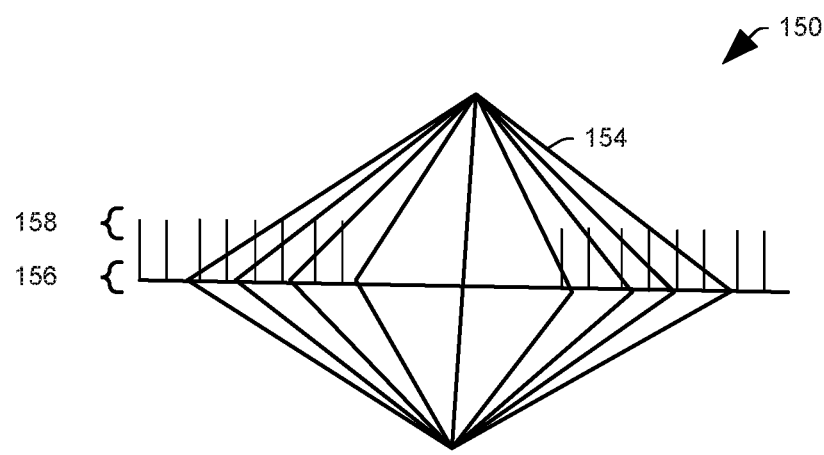
FIG. 7 illustrates another example implementation of an improved ionocraft in accordance with an aspect of the present invention, shown in a side view.
Figure 8:
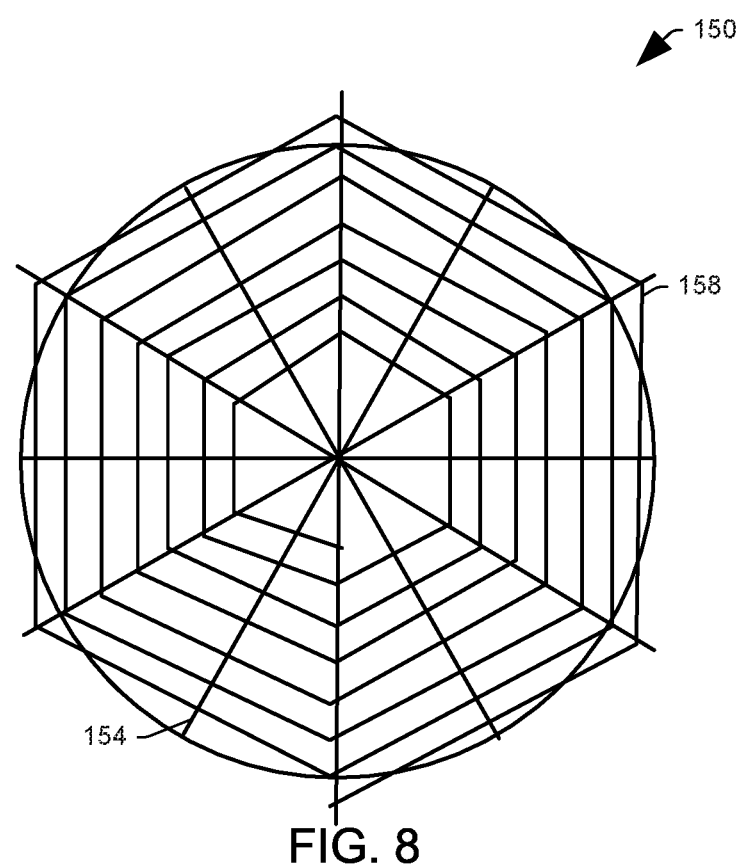
FIG. 8 shows a top view of the device of FIG. 7.

FIG. 7 illustrates another example implementation 150 of an improved ionocraft in accordance with an aspect of the present invention, shown in a side view. FIG. 8 shows a top view of the device 150 of FIG. 7. In the example shown in FIGS. 7 and 8, the basic frame structure has been assembled using 0.008 inch diameter boron filaments rather than carbon fiber or other materials due to the fact that boron is somewhat more rigid by weight and also is a very poor conductor of electricity, which avoids interference with the operation of the collector surfaces. The inventor has discovered that having a single radial shaped structure provided the highest strength to weight ratio. Having several pods or separate structures wastes structural materials and leads to a higher density per lifting force vehicle, this is not however to be taken as an absolute rule since several pods made of concentric circles might offer a way to get separate quadrants for steering purposes without adding many extra corners. The vehicle has a mast protruding vertically above and below the center of the device. The reason for having a mast as such is to provide a connection point for the guy wires shown in FIG. 2. Relatively thin guy wires (e.g., 154) for this version of the craft are placed around every 3 to 4 inches along the spoke like frame members and run to the top of the upper mast and bottom of the lower mast, these provide vertical structural rigidity with the least possible weight. The guy wires are made of 0.002 inches, may vary, in diameter nylon thread, so as to be light weight but adequate in strength. Previous designs have utilized fewer, larger guywires for support, but the inventor has found that, to the extent feasible, increasing the number of guywires, while lowering their thickness, helps to avoid twisting and achieve sufficient structural rigidity with the least weight.

In the example shown in FIGS. 7 and 8, the collector 156 can be made of 3-micron thick aluminized polyester film formed into a hexagonal spiral shape. The shape of the collector has been found to be most efficient if it has a cross sectional shape like a tear drop having the rounded edge facing upwards, a thickness of about 4 mm, and height between 9 and 12 mm Normally one might assume such thin walled, 3 um, materials to be inadequate in terms of rigidity, however, when such a material is formed into a tube or streamlined tube structure there is sufficient rigidity to maintain an adequate shape during flight, provided that the collector is supported at sufficient intervals by a boron or other nonconductive or conductive frame. Reiterating some of this information as it relates to the figures, the emitter wires 158 follow a similar hexagonal spiral pattern. The emitter wires are formed from thin (e.g., 2.5 micron) conductive wire supported by nylon, Kevlar, or other thread.

The control circuit for the illustrated device operates similarly to that illustrated in FIG. 6. In this embodiment, the Cockroft Walton half wave multiplier is formed placing all the capacitors in a straight line at intervals and arranging all the wires in between them. The diodes and their leads form arcs or humps between the nodes. This results in a much longer voltage multiplier that needs little or no electrical insulation thereby saving considerable weight. It has been noticed under ultraviolet imaging that corona tends to build up at the ends of shorter voltage multipliers representing significant power losses. A longer voltage multiplier is not only more efficient but can be placed on the upper mast to span the distance between the collector and emitter. Placing the component in this manner as such eliminates the need for "go around wires", wires that are placed in wide arcs around the machine in order to power up the emitter surface without arcing out or requiring heavy insulation. Other improvements in voltage multiplier construction include using optimized capacitor sizes and weights for a given high frequency, optimization of diode size and characteristics, as well as the number of stages for the multiplier that work best for a given ion propulsion machine/system. The inventor has determined that about twenty-four stages is optimal for a craft with around a 7 and ¾ inch gap between the collector and emitter. It has been found that for these voltage multipliers the elimination of the circuit board saves weight and point to point surface mount components is the best type of circuit architecture. A 20-stage voltage multiplier also works exceptionally well when a 6-inch gap is used.

In another implementation, a combination mast/voltage multiplier is used, thereby taking advantage of the structural rigidity of the actual components. In one such embodiment a 12 micron thick circuit board was used and rolled into a tube so as to create a tubular voltage multiplier with very thin etched traces, as long as the parts are then separated buy sufficient distances. The device is clearly longer than a normal voltage multiplier, so the capacitors need not be positioned in a single straight line.

The use of a long voltage multiplier spanning the gap between the emitter and collector has been found to significantly improve the performance of the ion powered craft. In one implementation, a double or triple helix arrangement for the capacitor and diode strings in order to eliminate sharp corners can be used. The inventor has also determined that, by putting a spark gap across the inlet to the voltage multiplier and connecting the output ground at the base of the multiplier to the opposite side of it, the multiplier's base a larger voltage can build up in the resonant transformer in strike mode, enabling a voltage multiplier to output a now pulsed higher voltage with a lower number of stages and a smaller input transformer. In order for this to work, the input stage capacitances on the multiplier are increased. In yet another embodiment of the device, the special voltage multiplier and transformer are attached modularly inside and above an ultra-lightweight central mast tube. The voltage multiplier is still used to add strength to the system, but the components can be easily unplugged for repair or upgrade as needed.

The power flow on one implementation of the device started in two 40 mAh, 50 c, or in later embodiments 110 mAh 30 c rate discharge lithium polymer batteries although it will be appreciated that other batteries with different properties can be used as well. The batteries are connected to a 125 mg-four-channel receiver that includes several microchips connected point to point, for example, via a welding, or corner soldering, process to reduce weight. Then the current can be applied to a push pull modern version of the Royer circuit, driving a roughly 3 m tall drum shaped transformer. The transformer is about 15 mm in diameter in one embodiment. In this embodiment, the transformer is wound with all quadruple or thicker coated magnet wire 50AWGQon the secondary and 29AWGQ copper on the later model's primary, with the 15 mm diameter transformer. It will be appreciated that existing transformer designed did not scale properly to the size and weight needed for this application, resulting in this novel, custom shaped, low profile transformer developed by the inventor. The resonating characteristics also must be optimized to run at about 3 kv under a very light total system load to provide the strike or start mode operation discussed previously.

In another implementation of the device, the transformer was adapted from a BXA-302 inverter, only 7 mm in diameter, with the circuit board discarded, and the outer ring was removed so as only to use the drum component. The connections on the bottom were cut with a Dremel tool to insure that the secondary coil of the transformer operated in a floating manner, since originally the transformer was grounded through the bottom plate. Such a ground was unacceptable for the 3 kV operation required of the new system. After adding new better insulated windings there must be a bubble free layer of epoxy or other material added between the secondary and primary coils. The primary coil is longer than the original one so as to operate more efficiently with 6 to 8 volts input, as it was only originally designed for about a 3.5 volt continuous input. A much larger inductor was substituted as it was found to give a better q factor and increase the efficiency and overall output of the system substantially. Since the transformer is really operating in strike mode, it is able to output up to 5 kV instead of the 880 Volts×2 that would be expected from 1 to 100 or a 110 step up ratio in a push pull system. Generally, under the required load it did not exceed a 3 kV output. Significant power efficiencies are realized via an exceptionally low-profile, large diameter to thickness ratio, well-insulated drum shaped transformer. Also, a push pull inverter is advantageous as produces double the voltage in a small space.

Conventional wisdom has generally resulted in previous ionocraft builders/inventors placing their emitter wires lower and closer to the collector surfaces in order to get the most lift. The inventor has determined that significant gains in efficiency can be realized by deliberately raising the emitter wires distance to the collector, as shown in this patent to at least around 5 just under 6 to 8 inches or more.

The inventor has discovered that if the power supply wires are connected to one place on the large emitter assembly and also one place on the large collector assembly, the craft will create most of its propulsion/wind from that connection area. The solution to this poorly distributed and therefore less efficient propellant flow is to have current distribution wires connected at regular intervals on both the collector and emitter. This is particularly helpful for spiral shaped embodiments. It should be noted, however, that the inventor has found both concentric rings and spiral configurations to be suitable for unassisted ion powered flight. Implementations of both structures have been made that are capable of lifting their own power supplies.

The inventor has determined empirically that having the emitter connected to the negative end of the power source is more quiet and efficient than connecting it to the positive terminal. This is the opposite of much of the literature. Steering can be accomplished by connecting the receiver outputs to two separate onboard actuators that operate four strings of variable resistors in order to attenuate the voltage to one or more of the four quadrants of the aerospace vehicle. Separating the device into separate quadrants causes power losses that can be overcome as previously mentioned or, by using weight shift steering or using servos to lower a needle or needles that are electrically connected to the power supply output, into the quadrant in which lift must be attenuated.

Other embodiments of this device can be powered by very extensive piles of high voltage thin film batteries, as mentioned, or special extremely light weight ultra-high voltage multiplier towers. If these towers are designed to produce five megavolts or more they can take advantage of the relativistic effects of the electrons momentum at high voltages. Megavolt towers have been built that demonstrate encouragingly that lighter higher voltage designs can be made. At around five to ten MV, the craft should fly due to expelled electrons only, as indicated by several mathematical models, and therefore operate entirely independent of the atmosphere without needing extra propellant depending on the total system weight and the power to weight ratio of the initial power source. Accordingly, in one implementation, the ion powered assembly can be a thruster deployed on a spacecraft to provide propulsion for the spacecraft, with or without the use of a provided propellant.

The inventor has also determined that dividing the device into quadrants in order to create attenuate-able sections for steering can create too many corners and too much power loss. If however, only the outer rings only are segmented or three or four separate pods are used that consist of smooth concentric circles, significantly fewer extra corners are formed. The multi-pod embodiment does not take advantage of the flight proven strength to weight advantage of having a single radially oriented lifting section.

Figure 9:
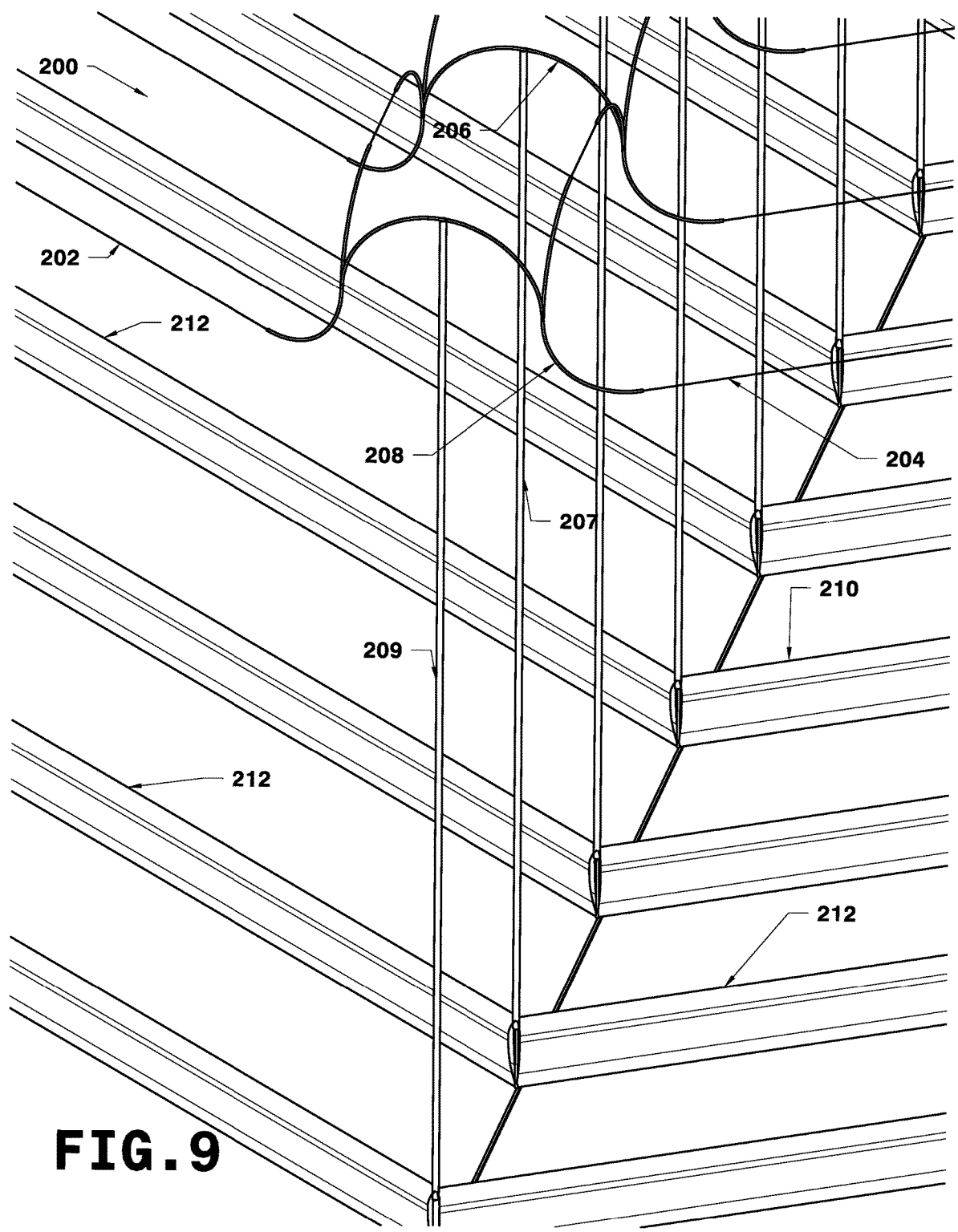
FIG. 9 illustrates a portion of a steering system that could be used with an ionocraft in accordance the present invention.

FIG. 9 illustrates a portion of a steering system 200 that could be used with an ionocraft in accordance the present invention. In the illustrated implementation, the steering system 200 can have one or more of the outer emitter wire rings 202 and 204 separated into three or more isolated bent oval like sections. The terminating ends of the outer emitter wire rings 202 and 204 curve upwards and then inwards, or outwards as needed, as shown in FIG. 9. The support assemblies 206 and 208 for the emitter wires 202 and 204 may resemble bell curve shaped humps with 90 degree elbows attached so as to allow all emitter and distributor wire connection junctions to form smooth gradual curves. A non-conductive post 207 and 209 holds each assembly upright. This also helps the gradual curves to be placed at an increased distance from the collector surfaces 210 and 212. This novel arrangement avoids corona losses, reduces extra corners, and minimizes the need for electrical insulation. The feet of the bell curve shaped supports 206 and 208 should be parallel with the emitter wires where they attach. The top of the bell curve shape also has a slight bend so as to be able to use them as corner junction pieces. Alternatively, this power saving steering system could be adapted for use on the collector assembly.

From the above description of the invention, those skilled in the art will perceive improvements, changes, and modifications. Such improvements, changes, and modifications within the skill of the art are intended to be covered by the appended claims.

I claim:

1. An ion powered assembly comprising:
a collector assembly comprising a plurality of concentric elements;
an emitter assembly, comprising a plurality of conductive emitter wires, the collector assembly and the emitter assembly being configured such that the plurality of concentric elements and the plurality of conductive emitter wires have a known separation; and
a control circuit operatively connected to at least the emitter assembly and the collector assembly and comprising a power supply configured to provide voltage to the emitter assembly and the collector assembly, wherein the power supply is configured such that a voltage difference between the plurality of concentric elements and the plurality of conductive emitter wires is less than one-fifteen of the breakdown voltage at standard temperature and pressure associated with the known separation of the plurality of concentric elements and the plurality of conductive emitter wires.

2. The ion-powered assembly of claim 1, wherein each of the plurality of conductive emitter wires has a diameter of less than five microns.

3. The ion powered assembly of claim 1, wherein the ion powered assembly is a thruster deployed on a spacecraft to provide propulsion for the spacecraft.

4. The ion powered assembly of claim 1, wherein the ion powered assembly is configured to move a vehicle in a direction orthogonal to the pull of Earth's gravity.

5. The ion powered assembly of claim 1, wherein each of the plurality of conductive emitter wires has a diameter of less than 2.5 microns.

6. The ion powered assembly of claim 1, wherein the collector assembly and the emitter assembly are configured such that the plurality of concentric elements and the plurality of conductive emitter wires are separated by no less than five and a half inches.

7. The ion powered assembly of claim 1, wherein an emitter wire support structure that supports the plurality of conductive emitter wires is configured to be parallel to the plurality of concentric elements.

8. The ion powered assembly of claim 1, wherein a central support of the collector assembly is located at a common centroid of the plurality of concentric elements, with the control circuit being implemented on, in, or beneath the central support.

9. The ion powered assembly of claim 1, the power supply comprising at least one photovoltaic cell.

10. The ion powered assembly of claim 1, wherein each concentric element of the plurality of concentric elements is formed from a non-conductive substrate coated with a layer of conductive material.

11. The ion powered assembly of claim 10, wherein the non-conductive substrate has a thickness of less than twenty microns.

12. The ion powered assembly of claim 1, wherein a given concentric element of the plurality of concentric elements is connected to the control circuit via a lead wire affixed to the given concentric element via a small pair of magnets acting as a clamp on opposing surfaces of the given concentric element.

13. The ion powered assembly of claim 1, the control circuit comprising a resonant transformer that is continuously driven at an associated resonant frequency with a light load, such that the resonant transformer remains in a start mode of the resonant transformer.

14. The ion powered assembly of claim 13, the control circuit further comprising an inverter, the inverter comprising an inductor having a diameter at least half that of the resonant transformer and configured to utilize a direct current (DC) signal from the power supply to provide an alternating current (AC) signal to the resonant transformer.

15. The ion powered assembly of claim 13, the transformer providing an output to a voltage multiplier that extends across the length of the central support.

16. The ion powered assembly of claim 13, the resonant transformer providing an output to a voltage multiplier comprising a ladder network of capacitors and diodes with a plurality of circuit paths containing diodes, a given capacitor and diode among the ladder network of capacitors and diodes being connected by a lead line soldered to a corner of each of a plurality of surface mount components.

17. The ion powered assembly of claim 1, wherein each of the plurality of concentric elements are circular.

18. An ion powered assembly comprising:
a collector assembly;
an emitter assembly, comprising a plurality of conductive emitter wires supported by an emitter wire support structure, each of the plurality of conductive emitter wires having a diameter of less than five microns; and
a control circuit operatively connected to at least the emitter assembly and the collector assembly and comprising a power supply configured to provide voltage to the emitter assembly and the collector assembly and a low profile, drum shaped transformer that is continuously driven at an associated resonant frequency with a light load, such that the resonant transformer remains in a start mode of the resonant transformer, a diameter of the resonant transformer being at least two and a half times a maximum thickness of the transformer.

19. The ion powered assembly of claim 18, the resonant transformer providing an output to a voltage multiplier comprising a ladder network of capacitors and diodes with a plurality of circuit paths containing diodes, a given capacitor and diode among the ladder network of capacitors and diodes being connected by a lead line soldered to a corner of each of a plurality of surface mount components.

20. The ion powered assembly of claim 7, wherein the emitter wire support structure includes a plurality of non-conductive mesh screens, each non-conductive mesh screen of the plurality of non-conductive mesh screens at least partially enclosing one of the plurality of conductive emitter wires.

* * * * *